US008503371B2

(12) United States Patent
Barriac et al.

(10) Patent No.: US 8,503,371 B2
(45) Date of Patent: Aug. 6, 2013

(54) LINK ASSIGNMENT MESSAGES IN LIEU OF ASSIGNMENT ACKNOWLEDGEMENT MESSAGES

(75) Inventors: Gwendolyn D. Barriac, San Diego, CA (US); Edward Harrison Teague, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 507 days.

(21) Appl. No.: 11/452,723

(22) Filed: Jun. 13, 2006

(65) Prior Publication Data

US 2007/0019596 A1    Jan. 25, 2007

Related U.S. Application Data

(60) Provisional application No. 60/691,703, filed on Jun. 16, 2005.

(51) Int. Cl.
*H04W 4/00* (2009.01)
(52) U.S. Cl.
USPC ............ 370/329; 370/341; 370/208; 455/450
(58) Field of Classification Search
USPC ................. 370/329, 341–349, 208; 455/450
See application file for complete search history.

(56) References Cited

U.S. PATENT DOCUMENTS

| | | | | |
|---|---|---|---|---|
| 5,732,351 | A * | 3/1998 | Olds et al. | 455/436 |
| 6,226,280 | B1 * | 5/2001 | Roark et al. | 370/330 |
| 6,532,227 | B1 * | 3/2003 | Leppisaari et al. | 370/348 |
| 6,693,892 | B1 * | 2/2004 | Rinne et al. | 370/348 |
| 2004/0002340 | A1 | 1/2004 | Lim et al. | |
| 2004/0042387 | A1 * | 3/2004 | Geile | 370/206 |
| 2004/0228320 | A1 * | 11/2004 | Laroia et al. | 370/349 |
| 2005/0220116 | A1 * | 10/2005 | Ahn et al. | 370/395.4 |
| 2006/0019687 | A1 * | 1/2006 | Garg et al. | 455/502 |
| 2006/0234707 | A1 * | 10/2006 | Byun et al. | 455/436 |

FOREIGN PATENT DOCUMENTS

| | | |
|---|---|---|
| JP | 04291435 | 10/1992 |
| JP | 07028728 | 1/1995 |
| JP | 2001521698 | 11/2001 |
| WO | WO9848581 A1 | 10/1998 |
| WO | WO03103333 | 12/2003 |

OTHER PUBLICATIONS

International Search Report—PCT/US2006/023506—European Patent Office, Nov. 13, 2006.
Writtten Opinion—PCT/2006/023506—European Patent Office, Nov. 13, 2006.
International Preliminary Report on Patentability—PCT/2006/023506—The International Bureau of WIPO-Geneva, Switzerland, Dec. 17, 2007.
802.20 Requirements Document—Ver. 9,May 2003 <<http://www.ieeee802.org/20/Contribs/C802.20-03-93.doc>>.
Translation of Office Action in Japan application 2008-517151 corresponding to U.S. Appl. No. 11/452,723, citing WO2003103333, JP2001521698 and 802_20_Requirements_Document_Ver_9_year_2003 dated Nov. 24, 2011.

* cited by examiner

*Primary Examiner* — Kibrom T Hailu
(74) *Attorney, Agent, or Firm* — Charles E. Eggers

(57) ABSTRACT

Systems and methodologies are described that facilitate communication by supplying an immediate re-send of an assignment, when such assignment is not decoded by an access node ("AN"). In one embodiment, the assignment to AT can be re-sent immediately, hence mitigating a requirement for the AT to indicate that "Yes" the assignment was received, or "No" that the assignment was not received. Accordingly, if the AN does not decode the assignment, the assignment is re-sent, and a request latency can be removed.

46 Claims, 11 Drawing Sheets

LINK ASSIGNMENT MESSAGES IN LIEU OF ASSIGNMENT ACKNOWLEDGEMENT MESSAGES

CLAIM OF PRIORITY UNDER 35 U.S.C. §119

This application claims the benefit of U.S. Provisional Application Ser. No. 60/691,703, entitled "METHODS AND APPARATUS FOR USING LINK ASSIGNMENT MESSAGES IN LIEU OF ASSIGNMENT ACKNOWLEDGEMENT MESSAGES" filed on Jun. 16, 2005, and assigned to the assignee hereof and hereby expressly incorporated by reference herein.

BACKGROUND

I. Field

The following description relates generally to wireless communications, and more particularly to efficient link assignment in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Moreover, for systems that employ sticky assignments (e.g., where assignments are kept until de-assigned), it is important that link assignment messages be delivered reliably, otherwise the receiver does not know which channel to demodulate and therefore can not decode its intended packets. Systems commonly employ Assignment Acknowledgement messages to confirm the reception/non-reception of assignment messages. However, sending such assignment acknowledgements can waste both time and power, and are typically never fully reliable. Other systems use non-sticky assignments wherein the frequent expiration of assignments provides some protection against occasional assignment errors. Yet, on many occasions not employing sticky assignments may not be feasible.

Therefore, a need exists in the art for systems and methods that facilitate efficient scheduling in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject innovation provides for systems and methods that facilitate communication by supplying an immediate re-send of an assignment, when an access node ("AN") does not decode on such assignment. Typically, if on a reverse link an assignment is being sent wherein an "AN" successfully decodes the assignment, such decoding can function as an acknowledgement signal ("ACK"—e.g., an assignment acknowledgement signal). Alternatively, not being able to decode on the assignment, in general does not clearly indicate whether the decode is being missed, or whether the access terminal (AT) has missed the assignment; and hence one embodiment of the subject innovation provides for re-sending the assignment immediately. Such mitigates a requirement for the AT to indicate that "Yes" the assignment was received, or that "No" the assignment was not received. Accordingly, if the AN does not decode on the assignment such assignment is re-sent, (e.g., immediately resending the assignment upon failing to decode on the assignment by the AN), and a request latency can then be removed.

In a related embodiment, in response to a request message by the AT that specifies data amount to be sent and the quality of service required (e.g., for the reverse link scheduler to work off of in the network), the AN can then supply an assignment to the reverse link. When the packet is not received, the system assumes that the request is still valid (e.g., validating the request even though no packet has been received)—and immediately sends a new assignment without being asked a new request. Accordingly, by re-assigning the exact same assignment, a requirement for the "AT" to make another request is mitigated. At the same time, a proper "AN" decoding of a package on a reverse link can act as a validation that such assignment was correctly received, at which point if it misses a decode on such assignment, then resending of the assignment no longer becomes necessary.

According to a further embodiment, in systems wherein "Acks" (e.g., acknowledgement signals) are not required to be sent on a forward link in support of a reverse link traffic, the subject innovation facilitates a mechanism for maintaining Medium Access Control (MAC) logic for reverse link assignment. In a related embodiment when AT requests assignment to transmit data, and AN then sends the assignment back—(yet it does not receive an associated packet to decode)—the subject innovation can set a limit on the number of times the assignment is being re-sent. Accordingly, upon a predetermined number of attempts for re-sending, another resource can then be selected. Moreover, a de-assignment message can also be sent to the AT, to halt the assignment request.

In a related embodiment, the subject innovation can typically eliminate the need for assignment acknowledgement messages on sticky assignments, wherein such messages draw on valuable resources. For example, in an RL if the AN decodes a packet, it recognizes that a mobile unit (e.g., user device) has received the assignment without the aid of an assignment acknowledgement message. Alternatively, if the AN fails to decode a packet on an invalidated assignment, it resends an assignment message. If such mobile unit indeed misses the assignment, then the AN typically does in fact need to resend an assignment message, and hence such transmission is no additional burden and consumes no additional resources. Likewise, if the AN misses the decode due to a poor channel, the resent assignment message can serve as an indication to the mobile unit to retransmit the packet. Similarly, if the AN misses the decode due to a missed start of packet (SOP), the resent assignment message resynchronizes the AN with the mobile unit. Additionally, means for performing various activities/methods can be provided in form of software/hardware components, to execute aspects of the subject innovation.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
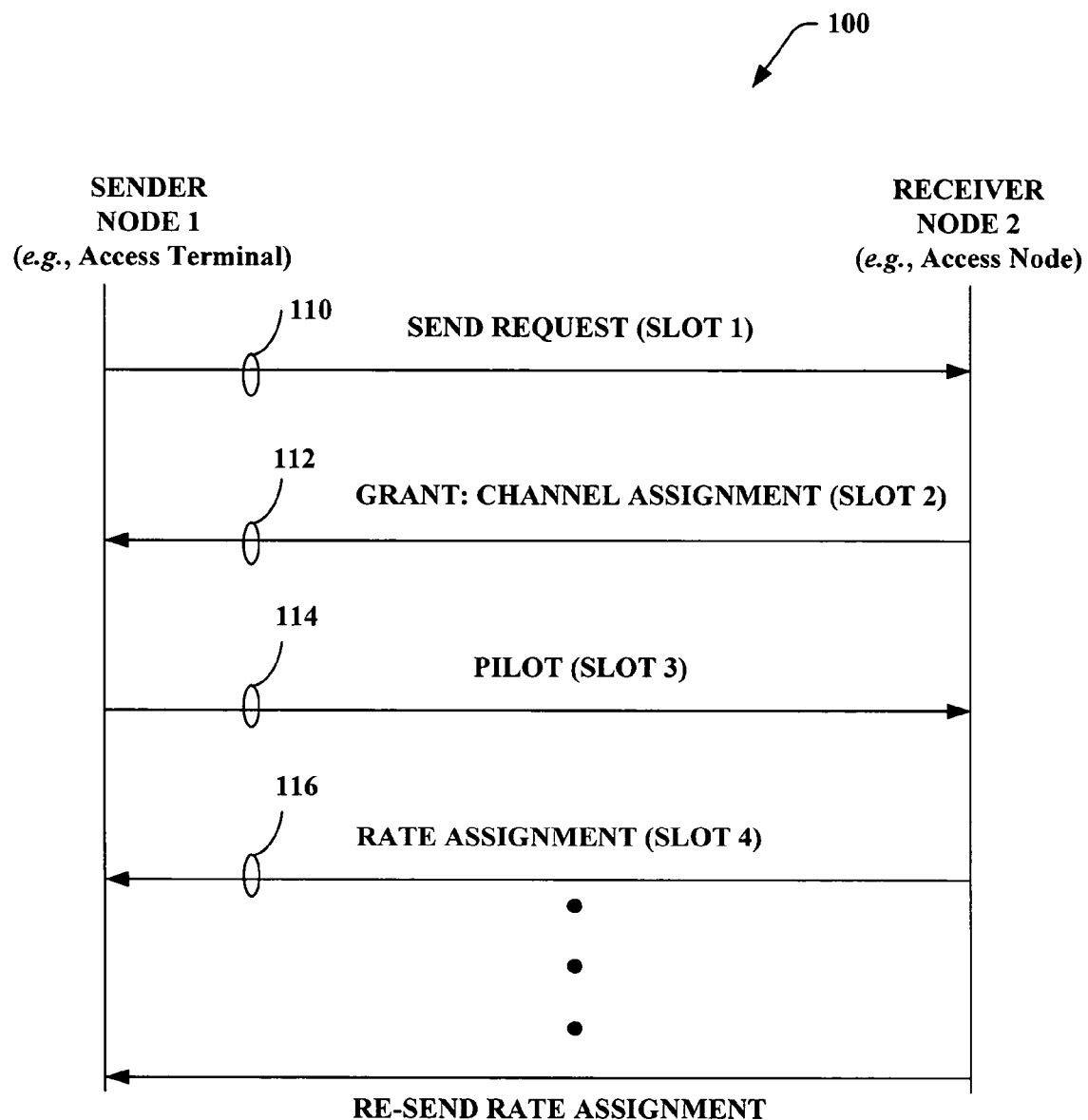
FIG. 1 illustrates a wireless communication between an access terminal (AT) and an access node (AN) in accordance with an embodiment of the subject innovation.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

Referring initially to FIG. 1, there is illustrated an exemplary message exchange scheme 100 (e.g., on a reverse link), which facilitates communication by supplying an immediate re-send of an assignment, when such assignment is not decoded by the "AN" (e.g., receiver node). Typically, if on a reverse link an assignment is being sent wherein an "AN" successfully decodes the assignment, such decoding can function as an acknowledgement signal ("ACK"—e.g., an assignment acknowledgement). Moreover, not being able to decode on the assignment, in general does not clearly indicate whether the decode is being missed, or that the access terminal (AT) missed the assignment- and hence one embodiment of the subject innovation provides for re-sending the assignment immediately. Such mitigates a requirement for the AT to indicate that "Yes" the assignment was received or "No" the assignment was not received. Accordingly, if the AN does not decode the assignment, the assignment is re-sent, and a request latency can then be removed.

The Message exchange scheme 100 can pertain to transmissions from a receiver node (e.g., such as access node) and a sender node (e.g., an access terminal). In one particular embodiment, at 110 and during time slot 1, a sender node can transmit a request to a receiver node. The receiver node provides a grant to the sender node during time slot 2, and at 112. Such grant can assign channel resources including, for example, an assigned power and/or an assigned channel (e.g., channel identification (ID)). The channel can be a frequency band (e.g., certain subcarriers of an available band), a time slot (e.g., certain subslots of a traffic slot), a spreading code assignment, a combination thereof, or the like. Furthermore, the grant can additionally or alternatively include information associated with a hybrid automatic repeat request (HARQ).

For example, the grant can include a HARQ fragment number, data (e.g., bit, . . . ), which indicates whether a transmitter should transmit a new packet, a HARQ retransmission of an old packet, and the like.

Next and at 114, the sender node can transmit a pilot via employing the assigned power and/or the assigned channel during time slot 3. The receiver node can further analyze the message based upon the pilot obtained from the sender node during time slot 3 as well as additional interference that can be caused by disparate nodes concurrently transmitting pilots during time slot 3, for example.

At 116, and during time slot 4, a rate assignment can be communicated from the receiver node to the sender node. Such rate assignment can relate to a modulation format, a coding format, and the like. The sender node can employ the power and/or the channel assigned in the grant obtained during time slot 2 and the rate assigned in the rate assignment provided during time slot 4 to subsequently transmit data to the receiver node. It is to be appreciated that any number of additional node pairs can concurrently utilize message exchange scheme 100. For example, message exchange scheme 100 can enable providing synchronous transmissions between any number of node pairs.

Accordingly, in response to a request message by the AT that specifies data amount to be sent and the quality of service required (e.g., for the reverse link scheduler to work off of in the network)—the AN can attain an assignment to the reverse link, and when the packet is not received, the system assumes that the request is still valid (even though no packet has been received)—and immediately sends a new assignment without being asked a new request. Accordingly by re-assigning the same assignment, a requirement for the "AT" to make another request is mitigated. At the same time, a proper "AN" decoding of a package on a reverse link can indicate as a validation that the assignment is correctly received, at which point if a decode is missed on such assignment, then a resend of the assignment no longer becomes necessary.

Figure 2:
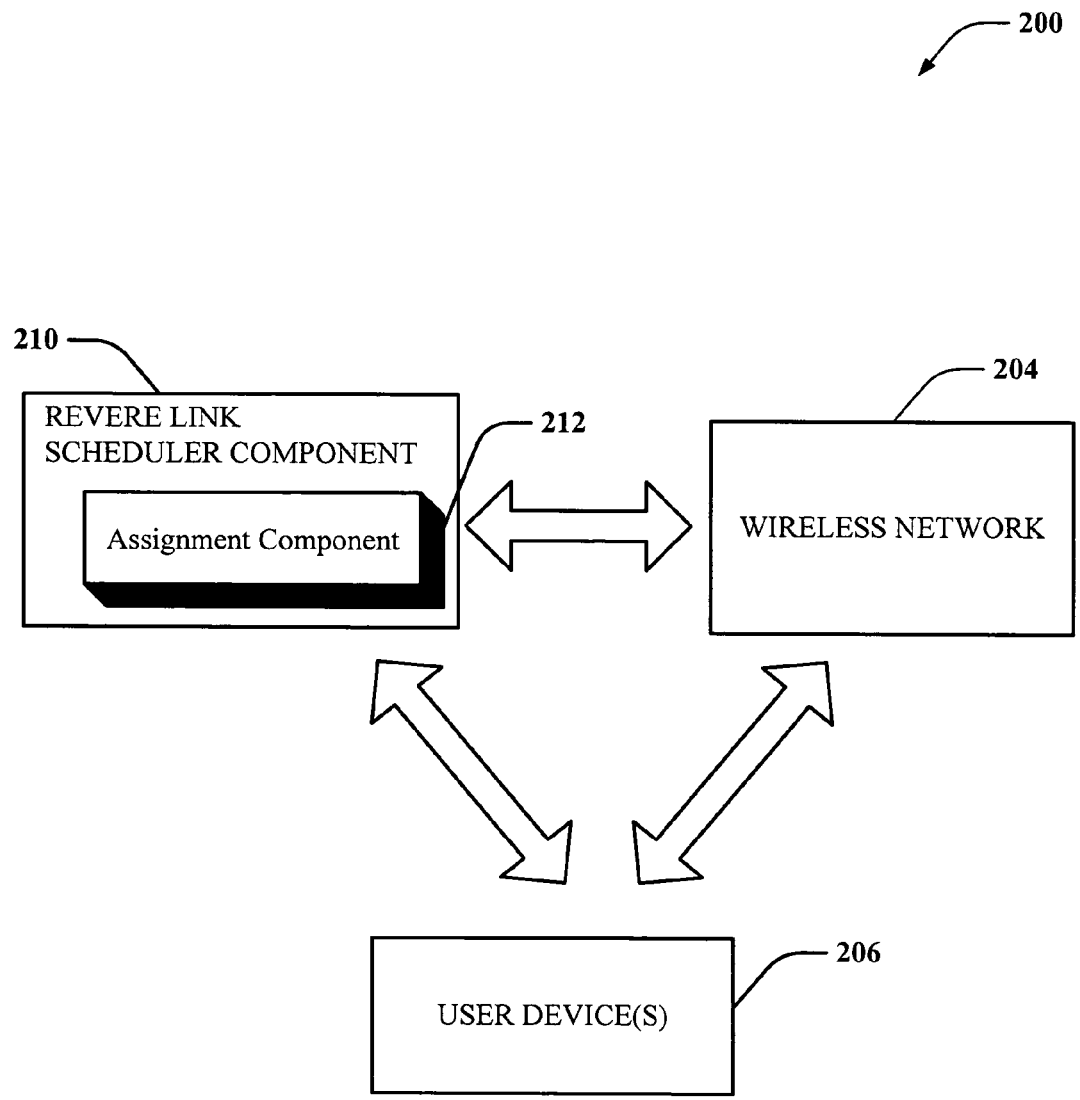
FIG. 2 illustrates a scheduler in a reverse link, which implements an immediate re-send of the assignments in accordance with an aspect of the subject innovation.

FIG. 2 illustrates a scheduler in a reverse link that implements an immediate re-send of the assignment(s) via the assignment component 212, in accordance with a particular embodiment of the subject innovation. The reverse link scheduler component 210 is operatively coupled to each of a wireless network 204 and user device(s) 206. Wireless network 204 can comprise one or more base stations, transceivers, and the like, which transmit and receive communication signals from one or more user devices 206. Additionally, wireless network 204 can provide communication service to user devices 206 in conjunction with an OFDM protocol, and OFDMA protocol, a CDMA protocol, a TDMA protocol, a combination thereof, or any other suitable wireless communication protocol. User devices 206 can be, for example, a cellular phone, a smartphone a PDA, a laptop, a wireless PC, or any other suitable communication device over which a user can communicate with the wireless network 204.

The reverse link scheduler component 210 can be a packet-based scheduler and can implement a link assignment (e.g., as set forth above with regard to FIG. 1) to facilitate link assignment and/or frequency set assignment to one or more user devices 206. For example, in response to a request message by the AT, which specifies data amount to be sent, and specifies the quality of service required for the reverse link scheduler 210 to work from, then the AN can be supplied with an assignment to the reverse link. If the packet is not received, the system assumes that the request is still valid (even though no packet has been received)—and immediately sends a new assignment without being asked a new request. Accordingly by re-assigning the same assignment, then a requirement for the "AT" to make another request is mitigated. At the same time, a proper "AN" decoding of a package on a reverse link can act as a validation that such assignment is correctly received; at which point if it misses a decode on such assignment, then a resend of the assignment is no longer necessary.

Figure 3:
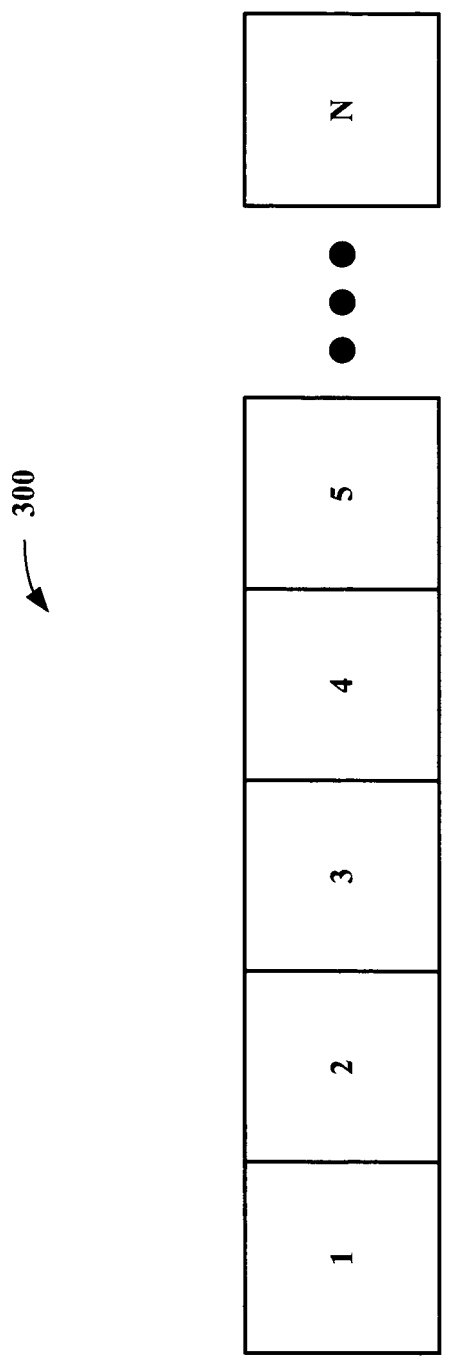
FIG. 3 illustrates a related embodiment, wherein upon a predetermined number of tries for assignment request, another resource selected among a plurality of resources can then be selected.

FIG. 3 illustrates a related embodiment, wherein upon a predetermined number of attempts for assignment request, another resource can then be selected. Moreover, a de-assignment message can also be sent to the AT, to halt the assignment request. As illustrated in FIG. 3, a group of N system resource blocks 300 (where N is an integer) are depicted in order to facilitate understanding of a manner in which various embodiments presented herein can operate. Such resource blocks 300 can represent, for instance, transmission channels, time slots, frequencies, code slots, a combination of the preceding, and the like. A general description of a subset of such blocks can be, for example, a block index list, such as a list of blocks assigned to a particular user.

According to an embodiment, decremental assignments can be generated and/or employed to facilitate resource block management, upon a predetermined number of attempts performed for assignment request. For example, a decremental assignment can be implicit or explicit. As such, an explicit decremental assignment can specify a portion of a user's existing assignment that should be removed from the user's assignment, while an implicit decremental assignment can be an assignment to another user that is observed by the first user and conflicts with the first user's assignment. In the latter case, such a conflicting assignment message to a second user can be interpreted by the first user as a decremental assignment. Moreover, the utilization of decremental assignments can further facilitate permitting a network to reduce assignment message overhead by transmitting a single assignment that simultaneously deassigns resources or conflicting users, and assigns such resources to an intended user. Decremental assignment messages can also be transmitted in a manner such that the assignment message is decodable by all current users affected by the deassignment (e.g., all users whose present resource assignment is in conflict with resources being assigned by a newly generated assignment, as well as the intended recipient of the assignment). Additionally, when assignment messages are limited in the number of related resource subsets that can be defined, then decremental assignments can facilitate alleviating assignment restrictions due to existing assignments to other users. For example, overlaps between user assignments can be construed as an implicit decremental assignment to a current assignee of a resource in favor of reassignment of the overlapping resource to a new intended user. Moreover, decremental assignment transmission permissions can be predicated upon validation of a previous assignment to a user (e.g., reception of some validating data, such as an indication of a successful packet or sequence decode over a reverse link, an acknowledgement over a forward link, . . . ). In such a manner, a network can validate a user's assignment prior to decrementing such assignment.

Figure 4:
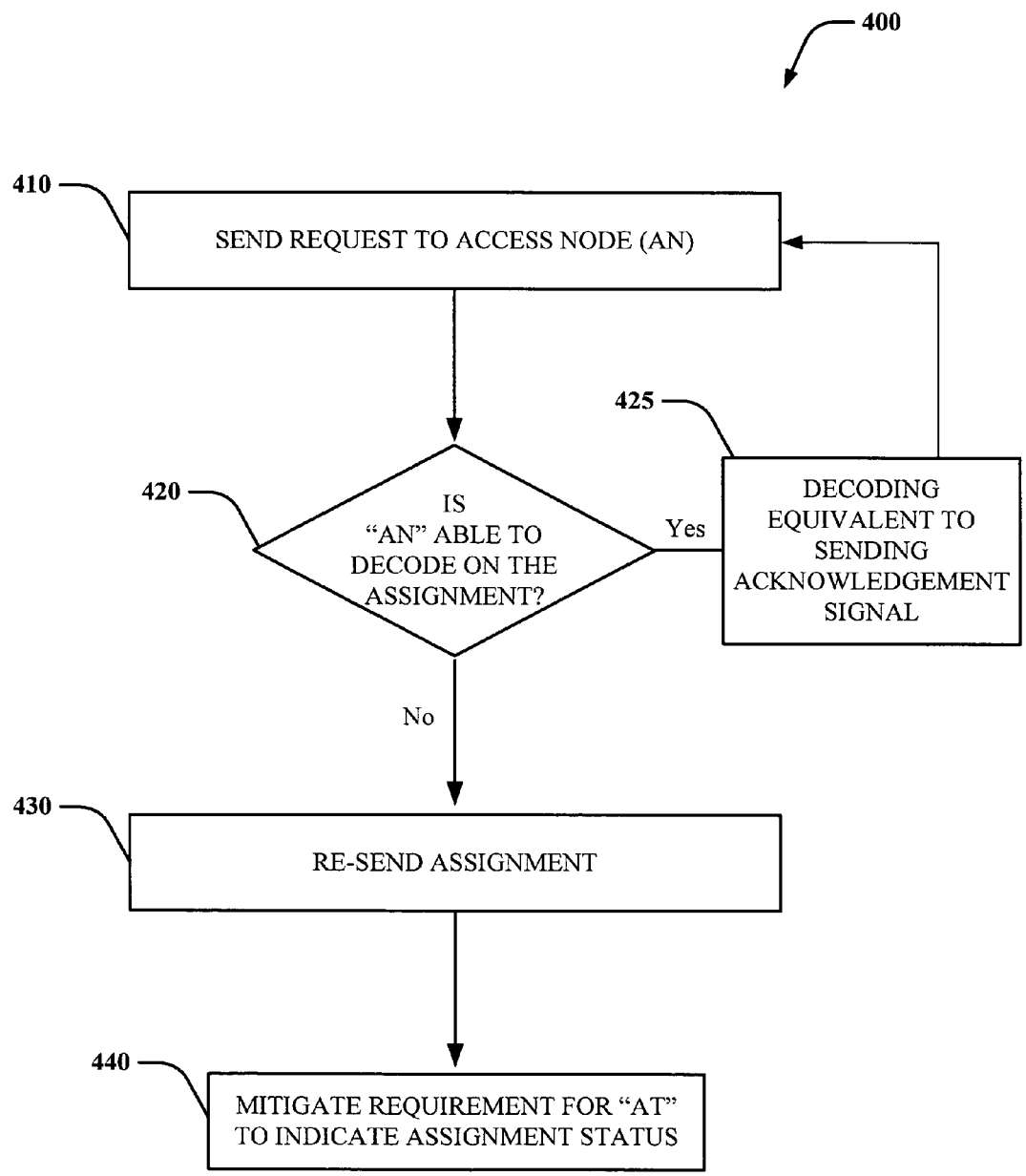
FIG. 4 illustrates a methodology of re-sending an assignment in accordance with an aspect of the subject innovation.

FIG. 4 illustrates a methodology 400 of re-sending an assignment in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 a request is being sent to the access node (AN). Subsequently and at 420, a determination is supplied as to whether the AN can de-code on the assignment. In general, if on a reverse link an assignment is being sent wherein an "AN" successfully decodes the assignment, such decoding can function as an acknowledgement signal ("ACK"—e.g., an assignment acknowledgement signal), as illustrated at 425. Moreover, not being able to decode the assignment, in general it does not clearly indicate whether the decode is being missed, or whether the access terminal (AT) missed the assignment; and hence one embodiment of the subject innovation provides for re-sending the assignment immediately, at 430. Such mitigates a requirement for the AT to indicate that "Yes" the assignment was received, or that "No" the assignment was not received, at 440.

Figure 5:
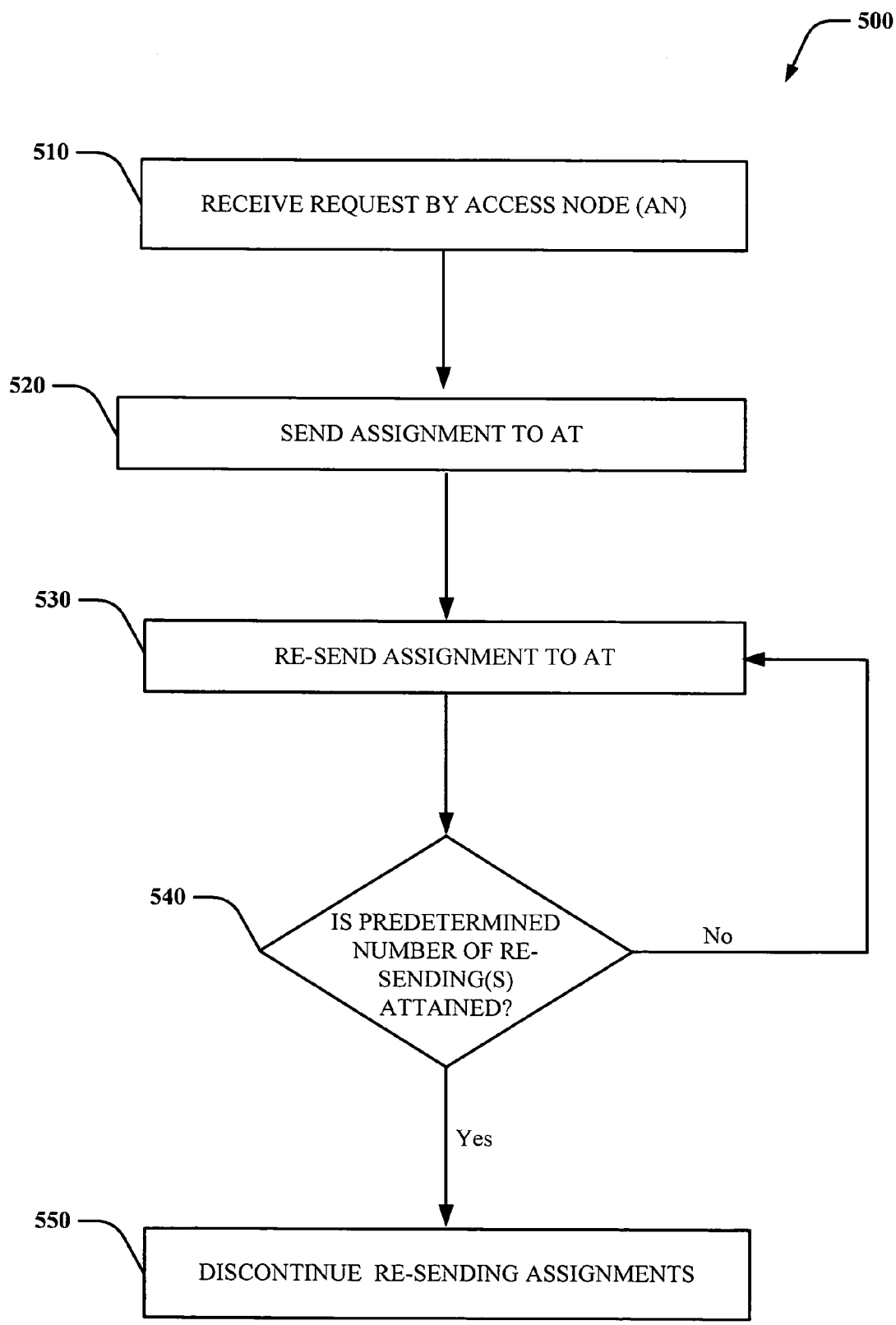
FIG. 5 illustrates a particular methodology of re-sending an assignment with predetermined number of iterations in accordance with an aspect of the subject innovation

FIG. 5 illustrates a particular methodology 500 of re-sending an assignment, until a predetermined number of iterations are reached in accordance with an aspect of the subject innovation. Initially and at 510, a request is received by the Access Node (AN). Such AN can then supply an assignment to AT, at 520. Next, and at 530 the exact same assignment can be resent to AT. As explained earlier, the methodology 500 can obviate a requirement for the AT to indicate its assignment status. At 540 a determination is made as to whether the predetermined number of re-sending for the assignment (e.g., M times, where M is an integer) has been attained. If so, re-sending the assignment is discontinued, at 550. Otherwise, the methodology returns to act 530 where the assignment is being re-sent to the AT.

Figure 6:
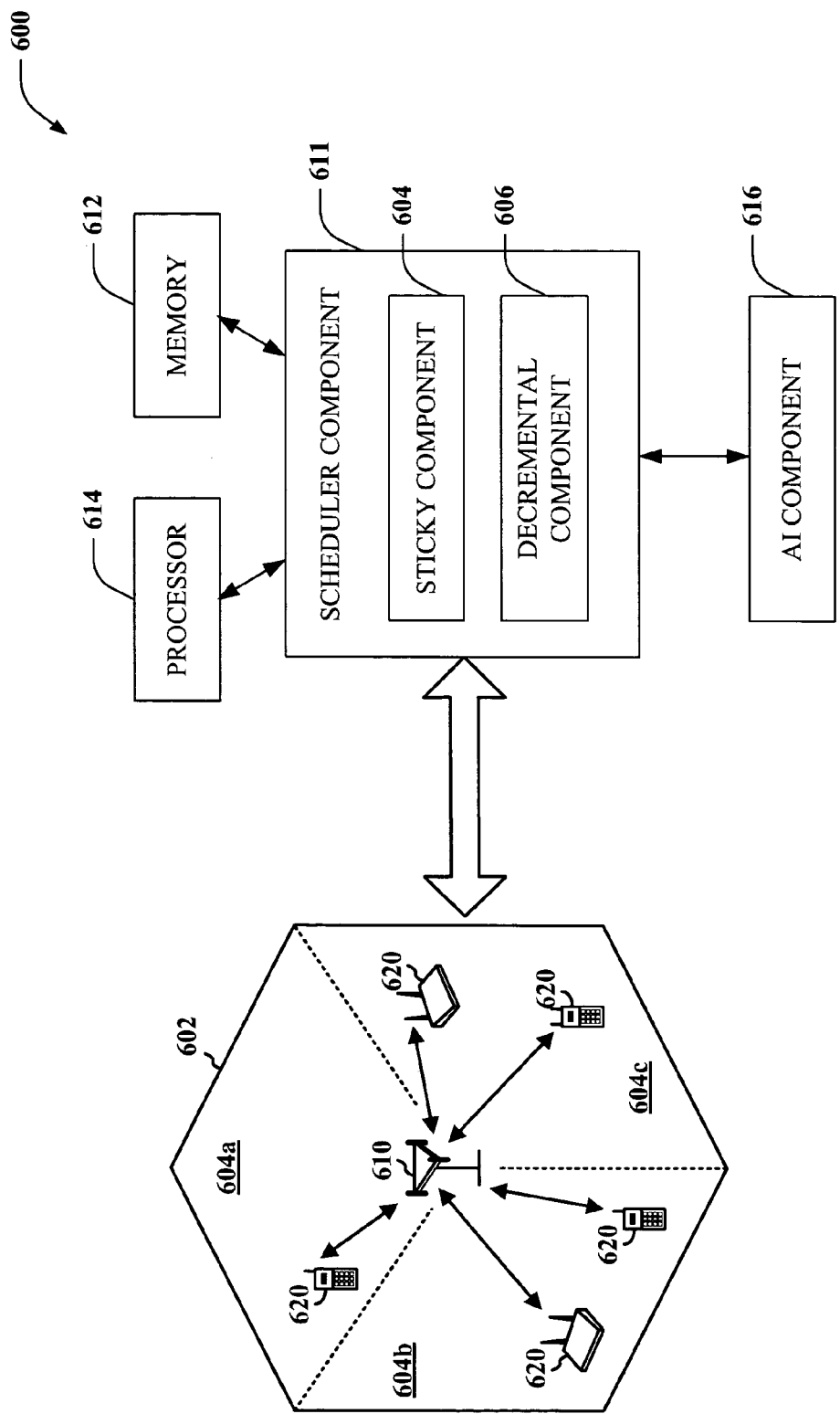
FIG. 6 illustrates a system of wireless communication system for a re-send of assignment in accordance with an aspect of the subject innovation.

FIG. 6 illustrates a wireless communication system 600 that implements re-sending an assignment to AT in accordance with an aspect of the subject innovation. The system 600 can include multiple base stations 610 and multiple terminals 620, which can be employed in conjunction with one or more aspects described herein. A base station is generally a fixed station that communicates with the terminals and may also be called an access point, a Node B, or some other terminology. Each base station 610 provides communication coverage for a particular geographic area 602. The term "cell" can refer to a base station and/or its coverage area depending on the context in which the term is used. To improve system capacity, a base station coverage area may be partitioned into multiple smaller areas (e.g., three smaller areas), namely; 604a, 604b, and 604c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 620 are typically dispersed throughout the system, and each terminal can be fixed or mobile. A terminal can also be referred to as a mobile station, user equipment, a user device, or some other terminology. A terminal can be a wireless device, a cellular phone, a personal digital assistant (PDA), a wireless modem card, and so on. Each terminal 620 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations. Reverse link data communication can occur from one access terminal to one or more access points, wherein communication can be facilitated by supplying an immediate re-send of an assignment, when such assignment is not decoded by an access node ("AN").

As illustrated in FIG. 6, the scheduler component 611 is operatively coupled to base stations 610, terminals 620 for and/or user devices. The sticky component 604 can assign sticky assignments. The system 600 can further comprise a memory 612 and a processor 614 (operatively connected to the scheduler component 611), and which store or process information related to channel desirability algorithms, metrics, available frequency sets, user device frequency assignment, and the like. The processor 614 can be operatively connected to the scheduler component 611 (and/or memory 612) to facilitate analysis of information related to desirability metrics, frequency reuse, and the like. It is to be appreciated that processor 614 can be any of: a processor dedicated to analyzing and/or generating information received by the scheduler component 611, a processor that controls one or more components of system 600, and a processor that both analyzes and generates information received by the scheduler component 611 and controls one or more components of system 600. Memory 612 can additionally store protocols associated with generating frequency assignments, metrics, and the like—such that system 600 can adjust transmission powers or update another scheduling metric via a power control algorithm. Moreover, it is to be appreciated be appreciated that the data store (e.g., memories) components described herein can be either volatile memory or nonvolatile memory, or can include both volatile and nonvolatile memory.

For example, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

As illustrated in FIG. 6, an AI component 616 can be operatively associated with the scheduler component 611 and can make inferences regarding adjusting transmission power for sub-carriers, and when and if to re-send an assignment (e.g., when such assignment is not decoded by an access node.) As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, the AI component 616 can infer an appropriate decremental assignment recipient based at least in part on, for instance, detected conflicting assignments, whether predetermined number of attempts in re-sending an assignment to an AT has occurred, and the like. Moreover, the AI component 616, in conjunction with processor 614 and/or memory 612, can determine whether resource blocks are limited and/or occupied by other users. Also, AI component 616 can make inferences regarding a cost-benefit analysis with regard to, for example, selection of a particular user device deassignment candidate from a group of potential candidates. Moreover, based at least in part on such inferences, a decremental component 606 can identify a particular user as the user to be decremented and can ensure that the conflicting assignment is viewable to other users.

According to another example, AI component 616 can make inferences regarding whether or not to completely deassign a conflicting user's assignments upon transmission of a conflicting assignment message to another user, or can set a limit on the number of times the assignment is being re-sent, in accordance with an aspect of the subject innovation. Accordingly, upon a predetermined number of tries, another resource can then be selected.

Figure 7:
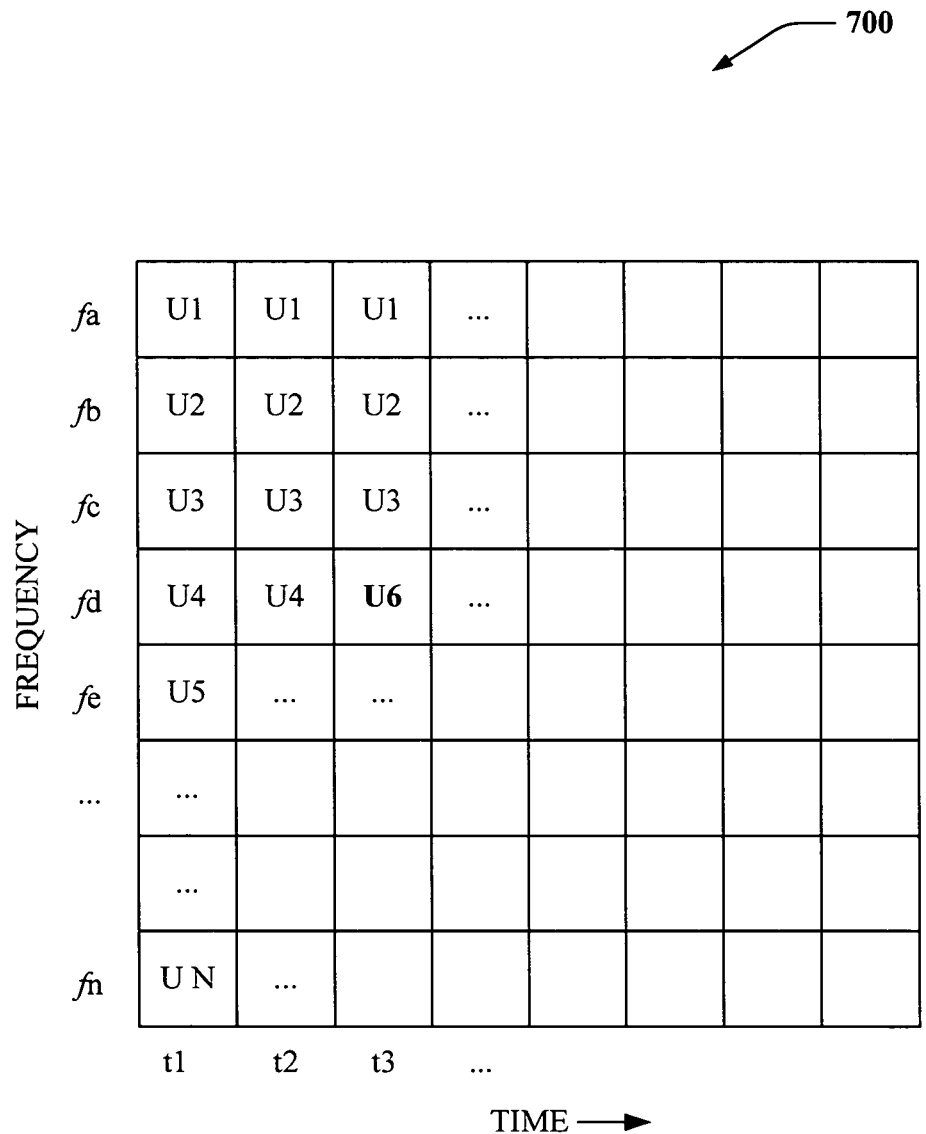
FIG. 7 illustrates a series of sticky assignment made over time, such as can be employed with respect to various embodiment of the subject innovation.

FIG. 7 is an illustration of a series of persistent, or "sticky" assignments 700 made over time, such as can be employed with regard to various embodiments described herein. For example, a first set of assignments can be transmitted to users 1-N (where N is an integer) during a first time frame, and such assignments can persist until one or more subsequent assignments are transmitted to one or more individual users. Thus, the first set of N assignments can suffice to provide system resource assignments to all users until a change in such assignments is desired and/or necessary (e.g., due to a change of prediction for expected power requirements of sub-carriers.) A subsequent user such as U6 can be assigned frequency D should such frequency become available, as illustrated at t3. Accordingly, fewer assignment messages need be transmitted over a network than when employing non-sticky assignments. The subject innovation can typically eliminate the need for assignment acknowledgement messages on sticky assignments, wherein such messages draw on valuable resources. For example, in an RL if the AN decodes a packet, it recognizes that a mobile unit (e.g., user device) has received the assignment without the aid of an assignment acknowledgement message. Alternatively, if the AN fails to decode a packet on an invalidated assignment, it resends an assignment message. If such mobile unit indeed misses the assignment, then the AN typically does in fact need to resend an assignment message, and hence such transmission is no additional burden and consumes no additional resources. Likewise, if the AN misses the decode due to a poor channel, the resent assignment message can serve as an indication to the mobile unit to retransmit the packet. Similarly, if the AN misses the decode due to a missed start of packet (SOP), the resent assignment message resynchronizes the AN with the mobile unit.

Additionally and as illustrated in FIG. 7, available system resources can be assigned to any user 1-N should the user require additional resources. For instance, it can be determined that U5 requires additional frequency availability at some time during communication over a network, in addition to frequency E. A subsequent assignment message can be transmitted to U5 to indicate that frequencies E and F are assigned U5. Moreover, in connection with the various embodiments detailed herein, such additional assignment message can be a supplemental assignment to mitigate consumption of network resources when reassigning frequencies to U5.

Figure 8:
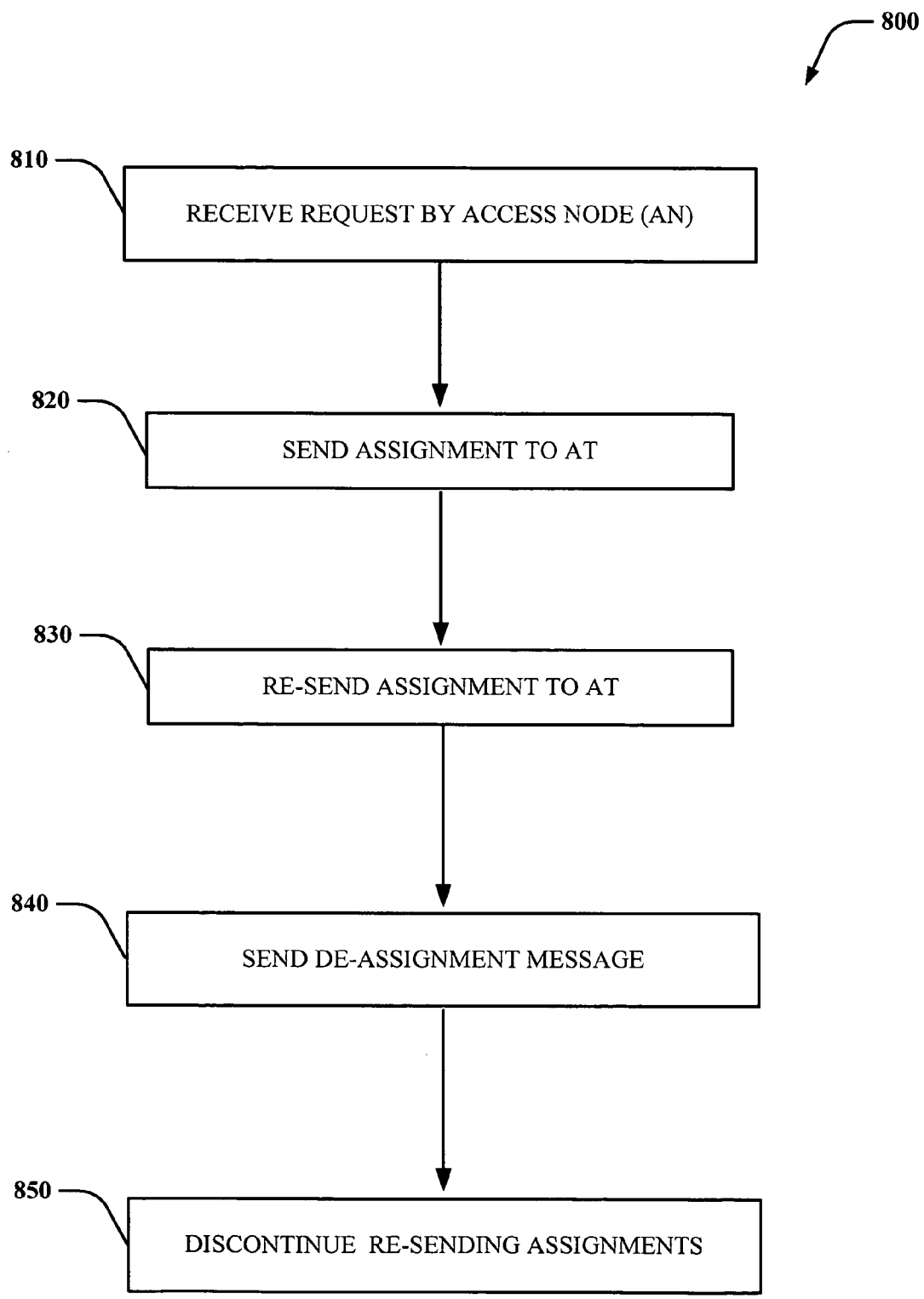
FIG. 8 illustrates a related methodology of employing a de-assignment message in accordance with an aspect of the subject innovation.

FIG. 8 illustrates a particular methodology 800 in accordance with an aspect of the subject innovation, wherein a de-assignment message is sent to the AT, to halt the assignment request. Initially and at 810, a request is received by the Access Node (AN). Such AN can then supply an assignment to AT, at 820. Subsequently, and at 830, substantially the exact same assignment can be resent to AT. Such mitigates a requirement for the AT to indicate that "Yes" the assignment was received or "No" the assignment was not received. At 840, a de-assignment message can be supplied to request halt of resending messages to the AT. As such, and 850 re-sending assignments can be discontinued.

Figure 9:
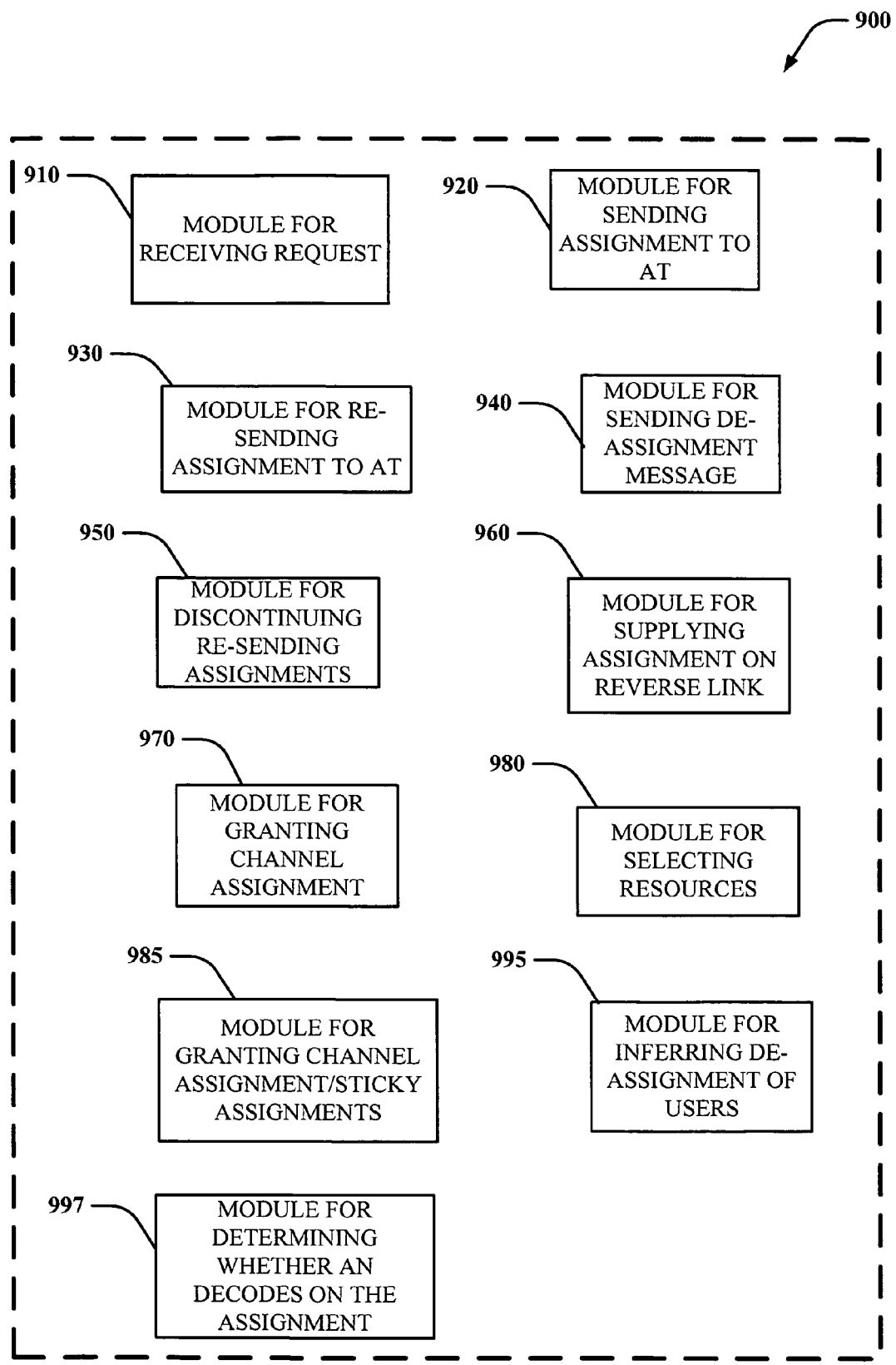
FIG. 9 illustrates a diagram related to an apparatus that incorporates a plurality of modules for performing various aspects of the subject innovation.

FIG. 9 is an apparatus that incorporates a plurality of modules for performing various aspects of the subject innovation. The term module can refer to a computer-related entity, either hardware, a combination of hardware and software, software, or software in execution, as well as an electro-mechanical component. For example, a module can be, but is not limited to, a process running on a processor, a processor, an object, an executable, a thread of execution, a program, and a computer. By way of illustration, an application running on a server and/or the server can be a module. In addition, a module can include one or more subcomponents. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. As illustrated in FIG. 9 the apparatus 900 can include a module 910 that can receive a request via the Access Node (AN). Next, the module 920 for sending assignment to AT, can then supply an assignment to such AT. It is to be appreciated that a separate module 960 can also supply such assignment on a reverse link. Subsequently, substantially the exact same assignment can be resent to AT, via a module 930 for re-sending an assignment to AT. The module 930 can also immediately resend the channel assignment after an initial attempt. The de-assignment message module of 940 can send de-assignment messages, and request halt of resending messages to the AT, for example. As such, the module for discontinuing re-sending assignments 950 can discontinue re-sending the assignment module. A module for selecting resources 980 can select resources, wherein upon a predetermined number of attempts for re-sending, another resource can then be selected via such module 980. Also, module 985 can grant channel assignment/sticky assignments on a reverse link when an access node ("AN") does not decode on such assignment, for example. Moreover, the module 995 can infer when various users should typically be de-assigned. In addition, module 997 can determine whether the AN decodes on the assignment.

As explained earlier, not being able to decode on the assignment, in general does not clearly indicate whether the decode is being missed, or whether the access terminal (AT) has missed the assignment; and hence one embodiment of the subject innovation provides for re-sending the assignment immediately via module 930. Such mitigates a requirement for the AT to indicate that "Yes" the assignment was received, or that "No" the assignment was not received. Accordingly, if the AN does not decode on the assignment such assignment is re-sent, (e.g., immediately resending the assignment upon failing to decode on the assignment by the AN), and a request latency can then be removed.

Figure 10:
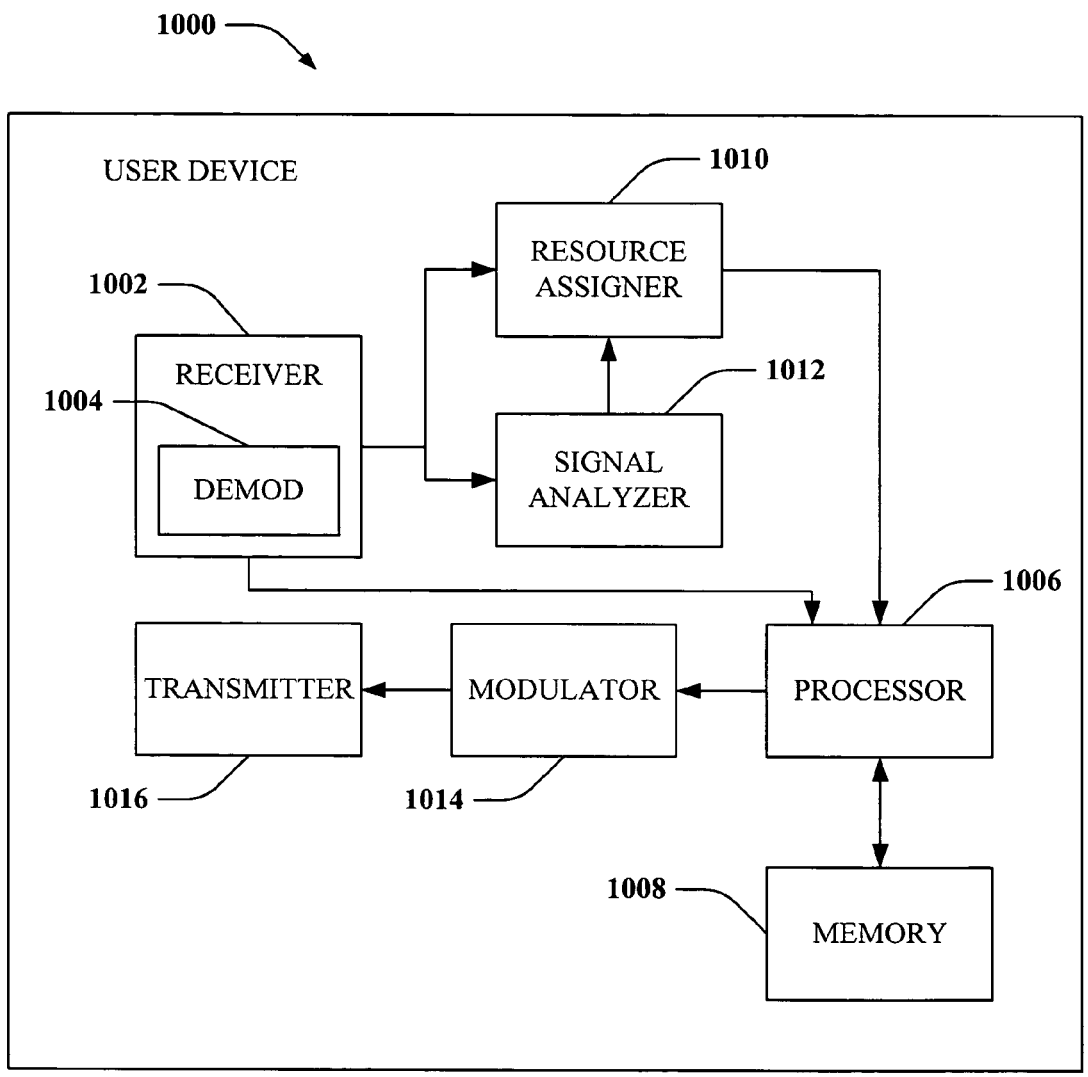
FIG. 10 illustrates a user device that facilitates estimating a channel and/or predicting a rate to be utilized in connection with a scheduling based on an inference of expected power requirements.

FIG. 10 is an illustration of a user device 1000 that facilitates link assignment in accordance with various aspects of the subject innovation. User device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of user device 1000, and/or a processor that both analyzes information received by receiver 1002, generates information for transmission by transmitter 1016, and controls one or more components of user device 1000.

User device 1000 can additionally comprise memory 1008 that is operatively coupled to processor 1006 and that may store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further operatively coupled to a resource assigner 1010 that allocates resources in response to obtaining data (e.g., a request, a pilot, etc.). For instance, receiver 1002 may receive a request and provide the request and/or information associated with the request to resource assigner 1010. In response to the request and/or information associated with the request, resource assigner 1010 may identify resources to be utilized (by a disparate node) in connection with future data transmissions. By way of illustration, the assigned resources may be a channel, a power, and the like.

Additionally, a signal analyzer 1012 may evaluate a pilot obtained via receiver 1002 as well as any interference. The signal analyzer 1012 may determine the strength of the pilot, the strength of the interference, and the like. Further, signal analyzer 1012 may estimate a signal to interference noise ratio (SINR) associated with a received transmission (e.g., pilot). Resource assigner 1010 may utilize the SINR to assign a rate (e.g., coding format, modulation format, etc.) to be utilized for the future transmission. User device 1000 still further comprises a modulator 1014 and a transmitter 1016 that transmits the signal to, for instance, an access point, another user device, etc. Although depicted as being separate from the processor 1006, it is to be appreciated that resource assigner 1010, signal analyzer 1012 and/or modulator 1014 may be part of processor 1006 or a number of processors (not shown).

Figure 11:
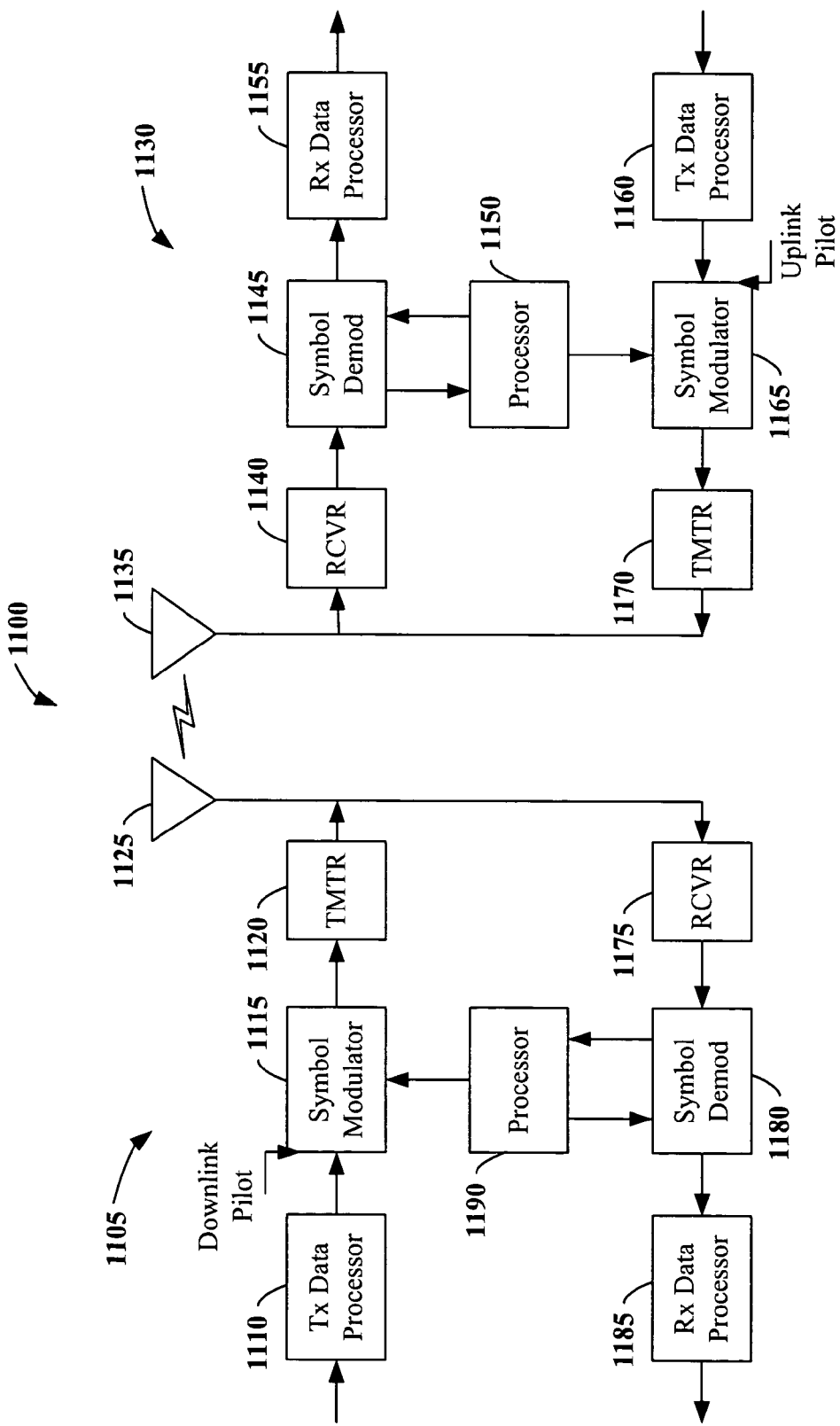
FIG. 11 illustrates an exemplary wireless communication system, which can employ inference of power requirements in accordance with an aspect of the subject innovation.

FIG. 11 shows an exemplary wireless communication system 1100. The wireless communication system 1100 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the systems and/or methods described herein to facilitate wireless communication there between.

As illustrated in FIG. 11, on a downlink at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and provides them to a transmitter unit (TMTR) 1120. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), de-interleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of facilitating link assignment in a wireless communication network, comprising:
    supplying a sticky assignment, from an access node (AN) in response to a request, the sticky assignment specifying an assigned data channel that remains assigned until de-assigned by a subsequent message from the AN;
    monitoring the assigned data channel for at least one packet to validate the assignment; and
    upon failing to decode any packets on the assigned data channel, re-sending the assignment without being asked via a new request.

2. The method of claim 1 further comprising sending the assignment for a reverse link.

3. The method of claim 1 further comprising immediately resending the assignment upon failing to decode a packet on the assigned data channel by the AN.

4. The method of claim 1 further comprising refraining from invalidating a request for an assignment when a packet is not received.

5. The method of claim 1 further comprising decoding a packet on a reverse link, to indicate validation for a correct receipt of the assignment.

6. The method of claim 1 further comprising maintaining a MAC logic for a reverse link when acknowledgment messages (ACKs) are not sent on a forward link in support of a reverse link traffic.

7. The method of claim 1 further comprising setting a predetermined limit on a number of times the assignment is being re-sent.

8. The method of claim 1 further comprising sending a de-assignment message to discontinue resending the assignment.

9. The method of claim 1 further comprising eliminating a requirement for assignment acknowledgement messages on sticky assignments where assignments are kept until de-assigned.

10. The method of claim 1 further comprising re-synchronizing the AN with a mobile device by the re-sending act.

11. An apparatus for facilitating link assignment comprising:
    means for granting a sticky channel assignment, the sticky channel assignment specifying an assigned data channel that remains assigned until de-assigned by a subsequent message;
    means for sending the channel assignment;
    means for monitoring the assigned data channel for at least one packet to validate the assignment; and
    means for immediately re-sending the channel assignment upon failing to decode any packets on the assigned data channel.

12. The apparatus of claim 11 further comprising means for receiving a request.

13. The apparatus of claim 11, the means for immediately re-sending the channel assignment further comprises means for re-sending the channel assignment without receiving a new request.

14. The apparatus of claim 11 further comprising means for supplying the assignment for a reverse link.

15. The apparatus of claim 11 further comprising means for selecting another resource upon re-sending the channel assignments for a predetermined number of times.

16. The apparatus of claim 12 further comprising means for determining whether an access node (AN) decodes any packets on the assigned data channel.

17. The apparatus of claim 15 further comprising means for setting the predetermined number of times the assignment is being re-sent.

18. The apparatus of claim 11 further comprising means for inferring de-assignment of users.

19. The apparatus of claim 11 further comprising means for discontinuing re-sending assignments.

20. A communication system that facilitates link assignment comprising:
    a scheduler component that schedules users on a reverse link, based on a sticky assignment that is supplied by an access node (AN) and persists until de-assigned by a subsequent message from the AN; and
    an assignment component that determines whether the AN has decoded any packets on a data channel assigned by the assignment to validate the assignment, and that supplies an immediate re-send of assignment absent a new request received by the AN if the AN fails to decode any packets on the assigned data channel.

21. The communication system of claim 20 further comprising a decremental component that identifies a user to be decremented.

22. The communication system of claim 20 further comprising an artificial intelligence component that facilitates link assignment.

23. A processor configured to execute the following instructions for facilitating link assignment:
    receiving a link assignment request by an access node (AN);
    sending a sticky assignment, by the AN, the assignment specifying an assigned data channel that remains assigned until de-assigned by a subsequent message from the AN;
    monitoring the assigned data channel for at least one packet to validate the assignment; and
    upon failing to decode any packets on the assigned data channel, sending once more the assignment by the AN without a request being received thereby.

24. The processor of claim 23 further configured to execute maintaining a MAC logic for a reverse link when acknowledgment messages (ACKs) are absent on a forward link in support of a reverse link traffic.

25. The processor of claim 23 further configured to execute sending a de-assignment message to halt forwarding of the assignment.

26. The processor of claim 23 further configured to execute decrementing the assignments.

27. A non-transitory machine-readable medium having stored thereon machine-executable instructions for:
    supplying a sticky assignment, from a an access node (AN) in response to a request, the sticky assignment specifying an assigned data channel that remains assigned until de-assigned by a subsequent message from the AN;
    determining whether the AN has decoded any packets on the data channel assigned by the assignment; and
    re-sending the assignment without being asked via a new request if the AN fails to decode any packets on the assigned data channel.

28. The non-transitory machine-readable medium of claim 27 further comprising machine-executable instructions for sending the assignment for a reverse link.

29. The non-transitory machine-readable medium of claim 27 further comprising machine-executable instructions for immediately resending the assignment upon failing to decode a packet on the assigned data channel by the AN.

30. The non-transitory machine-readable medium of claim 27 further comprising machine-executable instructions for refraining from invalidating a request for an assignment when a packet is not received.

31. The non-transitory machine-readable medium of claim 27 further comprising machine-executable instructions for decoding a packet on a reverse link, to indicate validation for a correct receipt of the assignment.

32. The non-transitory machine-readable medium of claim 27 further comprising machine-executable instructions for maintaining a MAC logic for a reverse link when acknowledgment messages (ACKs) are not sent on a forward link in support of a reverse link traffic.

33. The non-transitory machine-readable medium of claim 27 further comprising machine-executable instructions for setting a predetermined limit on a number of times the assignment is being re-sent.

34. The non-transitory machine-readable medium of claim 27 further comprising machine-executable instructions for sending a de-assignment message to discontinue resending the assignment.

35. The non-transitory machine-readable medium of claim 27 further comprising machine-executable instructions for eliminating a requirement for assignment acknowledgement messages on sticky assignments where assignments are kept until de-assigned.

36. The non-transitory machine-readable medium of claim 27 further comprising machine-executable instructions for re-synchronizing the AN with a mobile device by the re-sending act.

37. A wireless communications apparatus, comprising:
- a memory that retains data related to channel assignments associated with reverse link communication; and
- a processor that enables supplying a sticky assignment, via an access node in response to a request, the sticky assignment specifying an assigned data channel that remains assigned until de-assigned by a subsequent message, determining whether the access node has decoded any packets on the data channel assigned by the assignment to validate the assignment, and re-sending the assignment without being asked via a new request if the access node fails to decode any packets on the assigned data channel.

38. The wireless communications apparatus of claim 37, wherein the processor further re-sends the assignment for a pre-determined number of times.

39. The wireless communication apparatus of claim 37, wherein the processor further halts re-sending the assignments.

40. The wireless communication apparatus of claim 37, wherein the processor further re-synchronizes an access node (AN) with a mobile device by resending the assignment.

41. The method of claim 1, wherein the assigned data channel is monitored for data packets including a data payload.

42. The method of claim 1, wherein failing to decode any packets on the assigned data channel comprises not receiving a packet on the assigned data channel.

43. The method of claim 1, wherein failing to decode any packets on the assigned data channel comprises receiving a signal on the assigned data channel and failing to properly decode the signal.

44. The method of claim 1, wherein re-sending the assignment instructs a receiving entity to resend at least one previously sent packet.

45. The method of claim 1, wherein re-sending the assignment is not prompted by receiving any assignment acknowledgement messages.

46. A method of facilitating link assignment in a wireless communication network without the use of corresponding assignment acknowledgment messages, the method comprising:
- sending an assignment message from an access node (AN) to a mobile device as part of a sticky assignment of one or more channels to the mobile device, the sticky assignment specifying an assigned channel that remains assigned until de-assigned by a subsequent message from the AN;
- monitoring the assigned channel for a packet other than an acknowledgment message;
- attempting to decode any packets received over the assigned channel being monitored, other than acknowledgment messages, to validate the assignment;
- determining that the assignment message was successfully received by the mobile device and validating the assignment if at least one packet other than an acknowledgment message is decoded by the AN on the assigned channel being monitored; and
- resending the assignment message to the mobile device if no packets other than acknowledgment messages are received over the assigned channel being monitored.

* * * * *